United States Patent [19]

Kitoh et al.

[11] Patent Number: 4,775,649

[45] Date of Patent: * Oct. 4, 1988

[54] DIELECTRIC PORCELAIN COMPOSITION

[75] Inventors: Ryozo Kitoh; Mikio Hitaka; Tetsuya Fujimoto, all of Yamaguchi, Japan

[73] Assignee: Ube Industries, Ltd., Tokyo, Japan

[*] Notice: The portion of the term of this patent subsequent to Nov. 2, 2003 has been disclaimed.

[21] Appl. No.: 888,968

[22] Filed: Jul. 22, 1986

[30] Foreign Application Priority Data

Jul. 24, 1985 [JP] Japan .................. 60-162117

[51] Int. Cl.$^4$ ............................................. C04B 35/46
[52] U.S. Cl. ...................................... 501/138; 501/136
[58] Field of Search ........................ 501/136, 138, 139

[56] References Cited

U.S. PATENT DOCUMENTS

| | | | |
|---|---|---|---|
| 4,248,727 | 2/1981 | Kawashima et al. | 501/137 |
| 4,362,637 | 12/1982 | Matsuo et al. | 252/62.3 BT |
| 4,438,214 | 3/1984 | Masayama et al. | 501/136 |
| 4,610,971 | 9/1986 | Wada et al. | 501/138 X |
| 4,621,067 | 11/1986 | Kitoh et al. | 501/136 |

FOREIGN PATENT DOCUMENTS

| | | |
|---|---|---|
| 50-34759 | 11/1975 | Japan . |
| 53-98098 | 8/1978 | Japan . |
| 59-23045 | 5/1984 | Japan . |
| 59-51086 | 12/1984 | Japan . |

*Primary Examiner*—Mark L. Bell
*Assistant Examiner*—Karl Group
*Attorney, Agent, or Firm*—Albert L. Jeffers

[57] ABSTRACT

A dielectric resonator to be advantageously used in 0.5–6 GHz band and having a large unloaded Q value, and adequate relative dielectric constant, a good stability of $\tau_f$ and a superior linearity of temperature characteristic of the resonance frequency, may be constituted by the dielectric porcelain composition expressed by the formula:

$$Ba_xSr_yCa_z(Zn_{\frac{1}{3}}Nb_{\frac{2}{3}})_{1-t}Ti_tO_3$$

in which $x+y+z=1$, x is within the range of 0 to 0.5, y is within the range of 0.5 to 0.999, z is within the range of 0.001 to 0.20 and t is within the range of 0.001 to 0.25.

2 Claims, 1 Drawing Sheet

DIELECTRIC PORCELAIN COMPOSITION

FIELD OF THE INVENTION

The present invention relates to a dielectric porcelain composition available as a material for dielectric resonator and capable of being used for other dielectric devices such as dielectric substrate for microwave integrated circuit, dielectric matching rod and the like. The present invention also relates to a dielectric resonator using said dielectric porcelain composition.

BACKGROUND OF THE INVENTION

In recent years, high performance miniaturized dielectric resonators have been required for achieving the integration of microwave circuits.

The dielectric porcelain composition used for dielectric resonators requires a large relative dielectric constant $\epsilon_r$ and is wanted to constitute dielectric resonator having superior stability of a temperature coefficient $\tau_f$ of the resonance frequency, good linearity of temperature characteristics of the resonance frequency and a large unloaded Q value. As such a dielectric porcelain composition, there have heretofore been reported several compositions such as $Ba(Zn_{\frac{1}{3}}Ta_{\frac{2}{3}})O_3$-$Ba(Mg_{\frac{1}{3}}Ta_{\frac{2}{3}})O_3$ described in the Japanese Patent Publication No. 59-51086, $CaTiO_3$-$MgTiO_3$-$La_2O_3 \cdot 2TiO_2$ described in the Japanese Open-Laid Patent Application No. 53-98098, $Sr(Zn_{\frac{1}{3}}Nb_{\frac{2}{3}})O_3$-$SrTiO_3$ described in the Japanese Patent Publication No. 50-34759 and $Ba(Zn_{\frac{1}{3}}Nb_{\frac{2}{3}})O_3$-$Sr(Zn_{\frac{1}{3}}Nb_{\frac{2}{3}})O_3$ described in the Japanese Patent Publication No. 59-23045.

However, when a dielectric resonator to be used at a high frequency band such as 0.5–6 GHz is constituted using the above conventional ceramic compositions, there have been such drawbacks that (1) since their specific dielectric constants $\epsilon_r$ are small, it has been impossible to sufficiently miniaturize the resonator; (2) Q is small or the dielectric loss is large; and (3) since the temperature characteristics of the resonance frequency in the range of $-40°$ C. $-60°$ C. do not have a sufficient linearity, in other words, since the change in the resonance frequency accompanying the temperature change is not linear, it has become difficult to compensate the temperature characteristics, depending on the ambient conditions of the resonator (such as linear expansion coefficient of metal case or resonator support); hence it has been impossible to adjust the temperature coefficient of the resonance frequency of the whole of the resonance system to a sufficiently small value. For example, in the case of the ceramic compositions of e.g. $Sr(Zn_{\frac{1}{3}}Nb_{\frac{2}{3}})O_3$-$SrTiO_3$, $Ba(Zn_{\frac{1}{3}}Nb_{\frac{2}{3}})O_3$-$Sr(Zn_{\frac{1}{3}}NB_{\frac{2}{3}})O_3$, etc., the values of Q, $\epsilon_r$, etc. are almost satisfactory at a frequency band of 0.5–6 GHz, but there is a drawback that the linearity of the temperature characteristics is not sufficient.

SUMMARY OF THE INVENTION

It is one object of the present invention to provide a dielectric porcelain composition available as a material for dielectric resonator, in particular as a material for dielectric resonator to be used in 0.5–6 GHz band.

It is another object of the present invention to provide a dielectric porcelain composition having a large unloaded Q value, an adequate $\epsilon_r$, a good stability of $\tau_f$ and a superior linearity of temperature characteristic of the resonance frequency.

It is still another object of the present invention to provide a dielectric resonator having available to be used in 0.5–6 GHz band and having a large unloaded Q value, an adequate $\epsilon_r$, a good stability of $\tau_f$ and a superior linearity of temperature characteristic of the resonance frequency.

The above objects of the present invention can be accomplished by the dielectric porcelain composition of the present invention which is expressed by the formula (I)

$$Ba_xSr_yCa_z(Zn_{\frac{1}{3}}Nb_{\frac{2}{3}})_{1-t}Ti_tO_3 \tag{I}$$

in which $x+y+z=1$, x is within the range of 0 to 0.5, y is within the range of 0.5 to 0.999, z is within the range of 0.001 to 0.20 and t is within the range of 0.001 to 0.25, and by the dielectric resonator of the present invention which comprises a porcelain having said composition expressed by the formula (I).

DETAILED DESCRIPTION OF THE INVENTION

Figure 1:
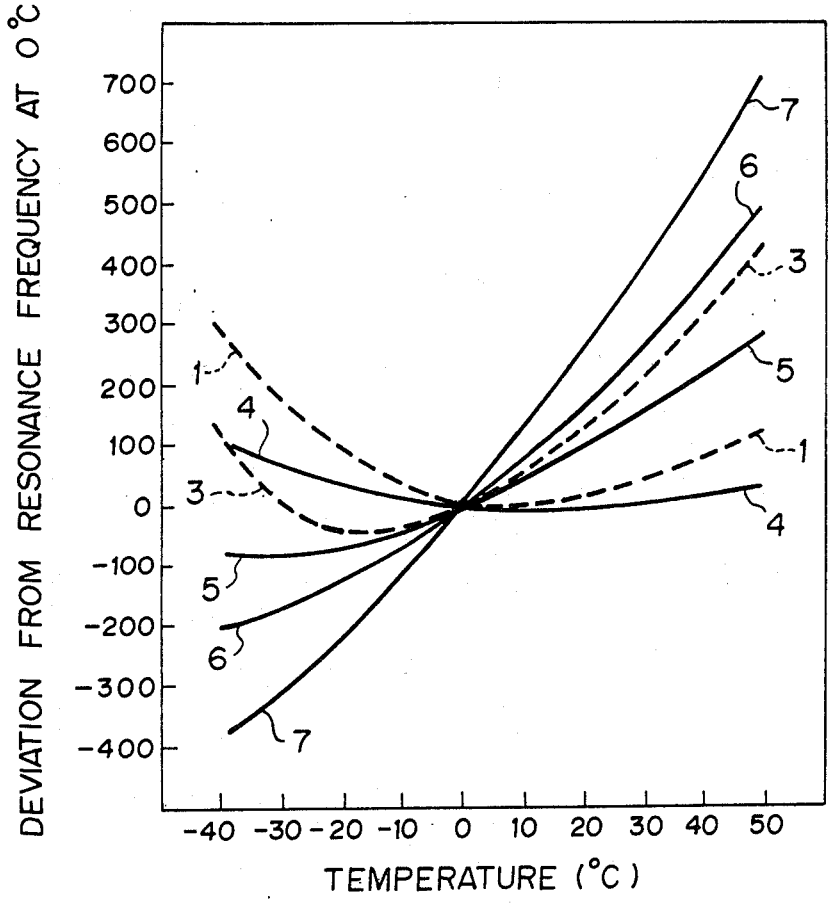
FIG. 1 shows graphs of the temperature dependency of the resonance frequency of the dielectric resonators of the present invention (solid line curves) and of the conventional dielectric resonators (broken line curves).

The necessity and limitation of each component of the dielectric porcelain composition of the present invention will now be described.

Ba or Sr is necessary for controlling the temperature coefficient $\tau_f$ of the resonance frequency. When the amount x of Ba exceeds 0.5, or when the amount y is less than 0.5, the temperature coefficient $\tau_f$ becomes too great.

Zn and Nb are necessary for constituting a dielectric having high dielectric constant.

Ca and Ti are necessary for giving an adequate $\epsilon_r$ to the dielectric porcelain composition and for advancing unloaded Q, stabilizing $\tau_f$ and improving linearity of temperature characteristics of the resonance frequency of the dielectric resonator of the present invention.

When the amount z of Ca is less than 0.001, said linearity of the temperature coefficient becomes unsatisfied. When z exceeds 0.20, the unloaded Q value lowers. When the amount t of Ti is less than 0.001, said linearity of the temperature coefficient becomes unsatisfied. When t exceeds 0.25, the unloaded Q value lowers as well as the coefficient $\tau_f$ becomes too great.

One of preferred embodiments of the dielectric porcelain composition of the present invention may be expressed by the following combination of x, y, z and t values.

$x=0.3-0.45$, $y=0.55-0.698$,
$z=0.002-0.008$, $t=0.002-0.008$.

The dielectric porcelain composition of the present invention has a large relative dielectric constant and is available for constituting a dielectric resonator having a large unloaded Q value. The resonator has a superior linearity of temperature characteristics of resonance frequency, in particular has a superior linearity of temperature characteristics at $-40°$ C. to $60°$ C.

The dielectric porcelain composition of the present invention is available as a material of various dielectric porcelain products or devices.

The dielectric porcelain products or devices may be produced using the dielectric porcelain composition of the present invention and as follows.

The dielectric porcelain may be produced by mixing starting raw materials of carbonates, oxides, etc. of barium, strontium, calcium, zinc, niobium, titanium, etc. based on said composition formula (I), followed by calcining the mixture, thereafter molding, burning and sintering it.

By way of example, barium carbonate, strontium carbonate, calcium carbonate, zinc oxide, niobium pentoxide and titanium oxide each in definite quantities are wet-mixed together with a solvent such as water, alcohols, etc., followed by removing water, alcohols or the like, thereafter grinding the mixture, calcining it in an oxygen-containing gas atmosphere (e.g. air atmosphere) at 800°–1,400° C. for about 10 hours, grinding the thus formed calcined material, thereafter mixing it with an organic binder such as polyvinyl alcohol to make the mixture homogeneous, drying, grinding and subjecting the resulting material to pressure molding (pressure: 100–1,000 kg/cm$^2$), and burning the molded material in an oxygen-containing gas (such as air) atmosphere at 1,400°–1,600° C. to obtain a dielectric porcelain.

The thus obtained dielectric porcelain can be used as it is, or if necessary, after processed into a material having a suitable shape and size, as a material for dielectric resonator, dielectric substrate for microwave integrated circuit, dielectric matching rod, etc. In particular, when the porcelain is used as a material for a dielectric resonator to be used in 0.5–6 GHz band, it takes superior effect. As the dielectric resonator, the porcelain is processed into, for example, a disc shape of a diameter of about 5–30 mm and a thickness of 2–12 mm.

The present invention will be described more minutely by the following Examples and Comparative Examples.

Example 1

Barium carbonate (BaCO$_3$) powder (0.26 mol), strontium carbonate (SrCO$_3$) powder (0.45 mol), calcium carbonate (CaCO$_3$) powder (0.0036 mol), zinc oxide (ZnO) powder (0.24 mol), niobium pentoxide (Nb$_2$O$_5$) powder (0.24 mol) and titanium oxide (TiO$_2$) powder (0.0036 mol) were placed in a ball mill together with ethanol, followed by wet-mixing the mixture for 10 hours, taking out the mixture from the ball mill, vaporizing off the solvent ethanol, grinding the residue by means of a triturator for one hour, calcining the ground material in an air atmosphere at 1,300° C., thereafter again grinding by means of a triturator for one hour, adding to the ground material, an adequate quantity of polyvinyl alcohol solution, homogeneously mixing the mixture, thereafter molding it into pellets of 15 mm$\phi$ in diameter and 5.5 mm thick, burning and sintering the pellets in an air atmosphere at 1,530° C. for 4 hours to obtain a dielectric porcelain.

The thus obtained porcelain of Example 1 was cut into a size of 11 mm$\phi$ in diameter and 4 mm thick, followed by measuring the disc according to dielectric resonance method to seek the unloaded Q value and the relative dielectric constant $\epsilon_r$ at a resonance frequency $f_o$ (2–6 GHz). Further, as to the temperature dependency of the resonance frequency, measurement was carried out in the range of −40° C.–50° C. to seek the temperature coefficient $\tau_f$. The results are shown in Table 1.

EXAMPLES 2 TO 17, COMPARATIVE EXAMPLES 1 TO 3

Disc samples of the dielectric resonator were produced in the same manner as in Example 1 with the exception that the values of x, y, z and t of said formula (I) were changed as in Table 1. The electric characteristics of the samples were measured. The results are shown in Table 1.

| | Formula of Dielectric Porcelain Composition: Ba$_x$Sr$_y$Ca$_z$(Zn$_1$Nb$_1$)$_{1-t}$Ti$_t$O$_3$ | | | | Temperature at Sintering (°C.) | Electrical Properties | | |
|---|---|---|---|---|---|---|---|---|
| | x | y | z | t | | $Q_u$ | $\epsilon_r$ | $\tau_f$ (ppm/°C.) |
| Example 1 | 0.368 | 0.627 | 0.005 | 0.005 | 1530 | 8500 | 42.0 | 0.7 |
| Example 2 | 0.388 | 0.607 | 0.005 | 0.005 | 1530 | 8600 | 42.0 | 2.2 |
| Example 3 | 0.408 | 0.587 | 0.005 | 0.005 | 1530 | 8400 | 42.0 | 4.4 |
| Example 4 | 0.392 | 0.606 | 0.002 | 0.002 | 1510 | 9000 | 42.0 | 0.4 |
| Example 5 | 0.391 | 0.606 | 0.003 | 0.003 | 1530 | 9000 | 42.0 | 0.8 |
| Example 6 | 0.391 | 0.605 | 0.004 | 0.004 | 1510 | 8900 | 42.0 | 1.6 |
| Example 7 | 0.3905 | 0.6045 | 0.005 | 0.005 | 1510 | 9200 | 42.0 | 2.4 |
| Example 8 | 0.288 | 0.692 | 0.020 | 0.020 | 1510 | 7400 | 44.0 | 1.3 |
| Example 9 | 0.263 | 0.697 | 0.050 | 0.050 | 1510 | 6300 | 45.0 | 2.2 |
| Example 10 | 0.3905 | 0.6045 | 0.050 | 0.040 | 1530 | 6400 | 45.0 | 4.6 |
| Example 11 | 0.3905 | 0.6045 | 0.005 | 0.08 | 1530 | 5900 | 46.0 | 5.8 |
| Example 12 | 0 | 0.97 | 0.030 | 0.100 | 1570 | 6800 | 42.1 | −6.5 |
| Example 13 | 0 | 0.96 | 0.040 | 0.100 | 1570 | 6900 | 45.4 | 4.4 |
| Example 14 | 0 | 0.94 | 0.060 | 0.130 | 1550 | 7200 | 43.8 | −11.1 |
| Example 15 | 0 | 0.90 | 0.100 | 0.180 | 1550 | 6700 | 45.7 | −3.2 |
| Example 16 | 0 | 0.90 | 0.100 | 0.200 | 1570 | 6400 | 46.9 | 1.3 |
| Example 17 | 0 | 0.88 | 0.120 | 0.240 | 1550 | 6100 | 47.3 | 3.6 |
| Comparative Example 1 | 0.393 | 0.607 | 0 | 0 | 1550 | 7300 | 41.0 | −0.3 |
| Comparative Example 2 | 0.402 | 0.598 | 0 | 0 | 1550 | 6900 | 41.0 | 1.0 |
| Comparative Example 3 | 0.422 | 0.578 | 0 | 0 | 1550 | 6400 | 41.0 | 2.9 |

Further, FIG. 1 shows a graph illustrating the temperature dependency of the resonance frequency in the range of −40° C.–50° C. in the above Examples and Comparative Examples. In FIG. 1, the solid line curves 4, 5, 6 and 7 show the temperature dependency of the samples of Examples 4, 5, 6 and 7, respectively. The broken line curves 1 and 3 show the temperature dependency of the samples of Comparative Examples 1 and 3, respectively.

As shown in the above Table 1, the dielectric porcelain composition of the present invention has a large relative dielectric constant. The dielectric resonator constituted by the dielectric porcelain composition may be miniaturized and has a large unloaded Q value.

As is recognized from FIG. 1, the linearity of the temperature characteristics of the dielectric resonator of the present invention is greatly improved as compared with the conventional dielectric resonators. The temperature coefficient $\tau_f$ of the resonance frequency is stabilized, and also in particular, since the temperature characteristics have a good linearity, it is possible to easily set the temperature coefficient $\tau f$ to an optional value. Thus, when the ambient conditions of the whole of the dielectric resonator are suitably designed, it is possible to adjust the temperature coefficient of the whole of the resonance system to nearly zero, and also it is possible to improve the performance of receivers, etc. to a large extent.

What is claimed:

1. A dielectric porcelain composition expressed by the formula:

$$Ba_xSr_yCa_z(Zn_{\frac{1}{3}}Nb_{\frac{2}{3}})_{1-t}Ti_tO_3$$

in which $x+y+z=1$, x is within the range of 0 to 0.5, y is within the range of 0.5 to 0.999, z is within the range of 0.001 to 0.20 and t is within the range of 0.001 to 0.25.

2. The dielectric porcelain composition as claimed in claim 1, in which x is within the range of 0.3 to 0.45, y is within the range of 0.55 to 0.698, z is within the range of 0.002 to 0.008, and t is within the range of 0.002 to 0.008.

* * * * *